United States Patent Office 3,021,374
Patented Feb. 13, 1962

3,021,374
SEPARATION OF ALCOHOLS
Pierre de Radzitzky, Brussels, Belgium, assignor to Labofina, Neder-Over-Humbeek, Belgium
No Drawing. Filed Oct. 3, 1958, Ser. No. 765,053
Claims priority, application Great Britain Oct. 9, 1957
6 Claims. (Cl. 260—631)

The present invention relates to the separation of alcohols, and more particularly to a method for the selective extraction of alcohols from an organic medium.

The separation of alcohols present in a non-ionic medium has normally been carried out by the classical separation methods such as fractional distillation. This technique however presents serious difficulties and is often inapplicable when the compound to be recovered is unstable at the temperatures necessary for the recovery, that is at the distillation temperature, or when it is present along with another compound which boils at a temperature very close to the boiling point of the compound to be recovered.

In order to avoid these difficulties attempts have been made to use the techniques of absorption and adsorption. These techniques have most often been utilized for the elimination of impurities or for the separation of a compound or several compounds from different members of a homologous series. Materials such as activated carbon, absorbent earth, alumina, mineral exchange resins (such as zeolite) and most recently organic exchange resins have been utilized for these separations.

However, the selective extraction of alcohols from an organic medium by means of organic exchange resins of the cationic type such as polystyrene cross linked by divinyl benzene and sulfonated have not been carried out.

It is accordingly a primary object of the present invention to provide a method for selective extraction of alcohols from an organic medium.

It is another object of the present invention to provide a method of selectively extracting one or more alcohols from an organic medium containing one or several alcohols by the use of cationic organic exchange resins.

It is yet another object of the present invention to provide a method for the selective extraction of an alcohol from a non-ionic organic medium in which another alcohol is present by the use of a specially cross linked organic exchange resin which is selective for one of the alcohols and which will not extract the other alcohol or alcohols.

Other objects and advantages of the present invention will be apparent from a further reading of the specification and of the appended claims.

With the above objects in view, the present invention mainly comprises a method of extracting an alcohol from an organic medium containing the same and perhaps also containing other alcohols comprising the steps of subjecting the organic medium containing the alcohol to be extracted to ion exchange with an organic ion exchange resin which is cross linked in such manner that the ion exchange resin will selectively absorb said alcohol from the organic medium, and subsequently extracting the absorbed alcohol from the ion exchange resin.

The ion exchange resins which are preferred according to the present invention are sulfonated resins and particularly sulfonated polystyrene resins. Most preferably a sulfonated polystyrene resin which has been cross linked by divinyl benzene and is in the acid form of the resin is utilized for the extraction purposes. The degree of cross linking of the polystyrene sulfonated resin may vary between 1 and 50%.

There are numerous compositions which are distinguished by the presence of one or several alcohols and for which selective separation of the alcohols is desirable. The process of the present invention is not limited to the application of the compositions set forth herein, these compositions being given to indicate the general industrial interest in the method of the present invention.

The process can, for example, be applied to the extraction of alcohols obtained by the Oxo synthesis. Thus, as is explained in U.S. Patent No. 2,768,981, the formation of hydrocarbons corresponding to the alcohols makes the distillation quite difficult, since the number of carbon atoms of the chains differ only slightly, and as a result the differences between the boiling points of the alcohols and of the corresponding hydrocarbons differs only slightly, and in addition azeotropes are formed.

The process of the present invention can be equally applied to the treatment of esters wherein the manufacture thereof requires an excess of alcohol in order to displace the equilibrium towards the production of satisfactory yields. The elimination of the alcohol by distillation can very easily result in a decomposition of the ester and it is thus very difficult to eliminate all of the alcohol and to reduce the volatility to satisfactory values which can be determined for certain applications such as in the use of the esters for plasticizers.

In the synthesis of synthetic lubricants of the diester type, the alcohol can and should be extracted and recycled.

The process for the separation of the alcohols from an organic medium is discussed herein in general form, that is to say from synthetic mixtures, but the particular applications of the process can be generally seen to apply very easily to industrial conditions of the above and of other type.

The exchange resins which may be utilized for the purposes of the present invention are in general the cationic resins. Numerous resins of this type exist, all of which are well known to those skilled in the art. The resins representative of this group are distinguished by the acid groups such as sulfonic, phosphonic, carboxylic, and phenolic groups.

The sulfonic resins are, as indicated above, the preferred group for the purposes of the present invention, and particularly the resins obtained by the sulfonation of a polystyrene and cross linked with small quantities of divinyl benzene.

The conditions under which the synthesis can take place and the properties of the products thus obtained, as well as the analogous indications for the other classes cited are given on pages 17 to 22 inclusive of the work by Krasman entitled, "Ion Exchange in Organic and Biochemistry," which may be found in Interscience 1957, or in the work of Kunin, entitled, "Ion Exchange Resins," published by Wiley in 1958, on pages 73 to 87.

Mixtures of resins of different type can be utilized. The resins can be utilized in the acid form designated by the symbol "H" or in the salt form. The acid form is however most active.

The resin is defined by the matrice, the acid radical, and the greater or lesser importance of the cross linking which is normally defined by the reactive quantity utilized for the bridging, expressed in percent and symbolically represented by "Xa" which is the percentage of the cross linking agent. Bridging or cross linking agents of the type utilized are: divinyl acetylene, divinyl benzene, methylallyl chloride, and non-saturated esters.

The method of the present invention generally is applied in organic medium, that is to say in the absence of water. By reason of the high degree of hygroscopicity it is of course extremely difficult to completely eliminate the water that remains fixed on the resin. Experience has shown however, that the presence of small quantities of water does not modify the expected power and it is of little importance to determine the quantity of water present.

A resin dehydrated in an evacuated chamber at a temperature of 80° C. to a constant weight retains its properties without any particular precautions being taken in order to avoid re-hydration.

In the tests which have been carried out the resin to be dried was passed through an evacuated heating chamber at a temperature of 80° C. until the resin reached constant weight.

The process of the present invention comprises the treating of a mixture from which an alcohol or alcohols are to be separated by a given resin in such manner that one compound only is absorbed, and then the absorbed compound is subsequently separated from the resin which has absorbed the same. Repeated treatments of this type permit selective separation of several alcohols present in an organic medium.

The absorption of the alcohol by the resin depends, all other conditions being equal, on the degree of cross linking and on the nature of the alcohol. The degree of cross linking is of course expressed as the percent of the cross linking compounds such as the divinyl benzene. As indicated above, the passing of the resin from the acid form to the salt form results in the reduction of the absorbing power thereof.

For the acid form of the acid resin Dowex 50 with a degree of cross linking of 2, of 8 and of 16, there is obtained the absorption set forth in Table I which gives the quantities of the alcohols extracted from a mixture of 50% of alcohol and 50% of benzene by one gram of the resin per 10 cc. of the mixture. (The limitations of the absorbing power noted for the highest molecular weights is probably due to a steric effect.)

The more a resin is bridged, the less will it absorb a given alcohol. For resins which are very slightly bridged, the absorption of the alcohol, expressed in weight or in volume, increases with the increase of the molecular weight up to a certain point where the length of the molecule and the side chains create a preponderant steric hindrance. It is easy to understand that to the extent that the steric effect does not play any role, the absorption is increased with the increase of the molecular weight because since each polar center of the resin contains one hydroxyl group and by reason thereof fixes the hydrocarbon skeleton of the alcohol molecule to it, as a result of which the volume increases with the increase of molecular weight. For resins which are highly bridged the steric effect is preponderant and the absorption of the alcohol diminishes directly with the increase of the molecular weight and with the side chains of the skeleton.

The absorption of the alcohols from the isocyanate or from the diester gives results analogous to those set forth in Table I.

The quantity of the alcohol absorbed varies according to the concentration of the alcohol in the solution for achieving a stage which depends on the quantity of the resin utilized and on the nature thereof (in particular on the degree of bridging). For low concentrations it is found that the classic isotherm absorption type curves are obtained. At 20° C. and with low concentrations of ethylhexyl alcohol it follows approximately the Freundlich law:

$$x = 0.2121\, y^{0.591}$$

wherein $x$ is the number of cc. of alcohol absorbed per gram of the resin and $y$ is the concentration of the alcohol at equilibrium expressed in volumes of alcohol in solution divided by the total volume of the solution.

For high concentrations of alcohol the absorption is directly proportional to the quantity of the resin utilized. In the case of a system of ethylhexyl alcohol and ethylhexyl sebacic ester, one gram of resin absorbs under these conditions 1.7 cc. of alcohol.

In adopting a degree of bridging which will exclude the absorption of higher alcohols but which will only absorb a lower alcohol, it is of course therefore possible to selectively absorb the latter. The quantity of resin necessary for this absorption can be evaluated by the characteristics of the resin as defined above.

TABLE I

[1 gram of resin is contacted with 10 cc. of a mixture of 5 cc. of benzene and 5 cc. of the alcohol; the absorptions are calculated in cc. per gram of resin]

| Alcohols | Resins | | | Boiling Point of the Alcohol in ° C. |
|---|---|---|---|---|
| | 50–X2 H | 50–X8 H | 50–X16 H | |
| Methanol | 1.05 | 0.71 | 0.45 | 64.65 |
| Ethanol | 1.15 | 0.8 | 0.6 | 78.5 |
| Propanol | 0.95 | 0.8 | 0.5 | 97.19 |
| iso-Propanol | 1.05 | 0.75 | 0.5 | 82.3 |
| n-Butanol | 1.02 | 0.7 | 0.41 | 117.71 |
| sec-Butanol | 1.11 | 0.77 | 0.51 | 99.5 |
| tert-Butanol | 0.96 | | | 82.8 |
| n-Pentanol | 1.25 | 0.76 | 0.5 | 138 |
| iso-Pentanol | 1.24 | 0.71 | | 130.5 |
| n-Hexanol | 1.2 | 0.95 | 0.45 | 157.2 |
| iso-Hexanol | 1.2 | 0.73 | 0.2 | 147 |
| 2 Ethylbutanol | 1.3 | 0.75 | 0.1 | 149.5 |
| Cyclohexanol | 1.14 | | | 161.5 |
| Heptanol-3 | 1.2 | 0.15 | | 156.2 |
| n-Octanol | 1 | 0.66 | 0.09 | 195 |
| Octanol-2 | 1.31 | 0.25 | | 179 |
| 2-Ethylhexanol | 1.65 | | | 183.5 |
| Nonanol | 0.86 | | | 213 |
| Dodecanol | | | | 255 |

The liquid which is thus treated can be the object of a second operation with a resin chosen as a degree of bridging or of cross linking such that only this absorption will be realized. It is thus possible to proceed successively as many times as necessary in order to obtain selective absorption of different alcohols present.

The alcohols absorbed are de-sorbed by heating under vacuum of the resin or by displacement of the alcohol by methyl alcohol and subsequently extracting the latter by distillation.

The resin thus treated can again be utilized for absorption purposes.

Solutions containing only a single alcohol to be treated can be treated with a resin having the lowest percentage of cross linking which will give the best absorption characteristics.

The following examples are given to further illustrate the present invention. The scope of the invention is not, however, meant to be limited to the specific details of the examples.

*Example I.—Examples of the purification of diesters*

(A) EXTRACTION OF BUTANOL IN THE PRESENCE OF BUTYL PHTHALATE

Starting with 10 cc. of a mixture containing 10.5% of the butyl alcohol, 3 grams of the resin Dowex 50–X12 H, dry, removes all of the alcohol. Utilizing under the same conditions the resin Dowex 50–X16 H, 2% or more of the alcohol remains in the solution and the time necessary to arrive at this equilibrium is longer than with the use of the first resin.

(B) EXTRACTION OF 2-ETHYLHEXYL ALCOHOL IN THE PRESENCE OF THE DI-SEBACIC ESTER OF 2-ETHYLHEXYL ALCOHOL

Taking 16 cc. of this diester containing 10% of the alcohol, 4 grams of the resin Dowex, 50–X2 H, dry, removes all of the alcohol. The same test with a resin more highly bridged (Dowex 15–X8 H) results in no absorption at all.

*Example II.—Separation of two alcohols and from benzene*

The following operating conditions are utilized:
The mixture of the three constituents is placed in contact with an excess quantity of the resin Dowex 50–X16

H, dry, which absorbs the alcohol having the chain which is most rectilinear. The absorption is permitted to continue until the index of refraction becomes constant.

The resin containing the absorbed alcohol is subjected to evaporation under vacuum at 100° C. with a slight current of nitrogen and the alcohol which is recovered is received in a solid carbon dioxide trap until constant weight is achieved.

An additional excess quantity of the resin Dowex 50–X2 H, dry, is added to the filtrate from the preceding operation, the resin absorbing the alcohol with the branched chain. The absorption is permitted to proceed until the index of refraction is constant and further operation is as above. There is thus obtained the second alcohol and the benzene.

In the case of a heavy alcohol it is possible to effect a complete extraction in the presence of the resin by methanol. The choice of the resin and of the alcohol is dictated by the considerations of Table I. The concentrations of the alcohol were measured by gas chromatography.

(A) FIRST EXAMPLE

A mixture containing 8 grams of benzene (boiling point 80.1° C.), 10 grams of iso-propanol (boiling point 82.3° C.) and 10 grams of tertiary butanol (boiling point 82.8° C.) is taken.

There is added to this mixture 40 grams of the resin Dowex 50–X16 H. There is recuperated by the resin a fraction containing 19 times more iso-propyl alcohol than butanol. This fraction is recovered from the resin. To the filtrate from this operation there is added 25 grams of the resin Dowex 50–X2 H. There is recovered from this resin a fraction containing 22 times more butanol than iso-propanol. The benzene is recovered in a filtrate and is pure 100% benzene.

(B) SECOND EXAMPLE

One part of a mixture containing 8 grams of benzene, 10 grams of heptanol-3 (boiling point 156° C.) and 10 grams of n-hexanol (boiling point 157° C.) is taken. There is added to this mixture 40 grams of the resin Dowex 50–X16 H. There is recovered from this resin a fraction containing 16.8 times more n-hexanol than heptanol-3. To the filtrate from this operation is added 17 grams of the resin Dowex 50–X2 H. There is recovered from this resin a fraction containing 15.1 times the amount of heptanol-3 as n-hexanol. Finally, there is recovered 70 grams of pure 100% benzene.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of separating alcohols from organic mediums, comprising the steps of subjecting an organic medium comprising at least one alcohol selected from the group consisting of methanol, ethanol, propanol, iso-propanol, n-butanol, sec-butanol, tert-butanol, n-pentanol, iso-pentanol, n-hexanol, iso-hexanol, 2-ethylbutanol, cyclohexanol, heptanol-3, n-octanol, octanol-2, 2-ethylhexanol, nonanol and dodecanol and also a substance selected from the group consisting of sebacic acid and phthalic acid esters of said alcohol and benzene to absorption by a polystyrene cationic ion exchange resin acidified with a group selected from the class consisting of sulfonic, phosphonic, carboxylic and phenolic groups and cross-linked by an agent selected from the class consisting of divinyl acetylene, divinyl benzene and methylallyl chloride the absorptive capacity of which is greater for said alcohol than for the other components of said organic medium, thereby selectively absorbing said alcohol by said resin; and desorbing said alcohol from said resin, thereby obtaining said alcohol.

2. A method of separating alcohols from organic mediums, comprising the steps of subjecting an organic medium comprising at least one alcohol selected from the group consisting of methanol, ethanol, propanol, iso-propanol, n-butanol, sec-butanol, tert-butanol, n-pentanol, iso-pentanol, n-hexanol, iso-hexanol, 2-ethylbutanol, cyclohexanol, heptanol-3, n-octanol, octanol-2, 2-ethylhexanol, nonanol and dodecanol and also a substance selected from the group consisting of sebacic acid and phthalic acid esters of said alcohol and benzene to absorption by the acidic form of a sulfonated polystyrene resin cross linked with 1–50% of divinylbenzene as a cationic ion exchange resin the absorptive capacity of which is greater for said alcohol than for the other components of said organic medium, thereby selectively absorbing said alcohol by said resin; and desorbing said alcohol from said resin, thereby obtaining said alcohol.

3. A method of separating alcohols from organic mediums, comprising the steps of subjecting an organic medium comprising at least one alcohol selected from the group consisting of methanol, ethanol, propanol, iso-propanol, n-butanol, sec-butanol, tert-butanol, n-pentanol, iso-pentanol, n-hexanol, iso-hexanol, 2-ethylbutanol, cyclohexanol, heptanol-3, n-octanol, octanol-2, 2-ethylhexanol, nonanol and dodecanol and also a substance selected from the group consisting of sebacic acid and phthalic acid esters of said alcohol and benzene to absorption by the acidic form of a sulfonated polystyrene resin cross linked with 2–15% of divinylbenzene as a cationic ion exchange resin the absorptive capacity of which is greater for said alcohol than for the other components of said organic medium, thereby selectively absorbing said alcohol by said resin; and desorbing said alcohol from said resin, thereby obtaining said alcohol.

4. A method of separating alcohols from organic mediums, comprising the steps of subjecting an organic medium comprising at least one alcohol selected from the group consisting of methanol, ethanol, propanol, iso-propanol, n-butanol, sec-butanol, tert-butanol, n-pentanol, iso-pentanol, n-hexanol, iso-hexanol, 2-ethylbutanol, cyclohexanol, heptanol-3, n-octanol, octanol-2, 2-ethylhexanol, nonanol and dodecanol and also a substance selected from the group consisting of sebacic acid and phthalic acid esters of said alcohol and benzene to absorption by the acidic form of a sulfonated polystyrene resin cross linked with 1–50% of divinylbenzene as a cationic ion exchange resin the absorptive capacity of which is greater for said alcohol than for the other components of said organic medium, thereby selectively absorbing said alcohol by said resin; and desorbing said alcohol from said resin by evaporation of said alcohol under vacuum, thereby obtaining said alcohol.

5. A method of separating alcohols from organic mediums, comprising the steps of subjecting an organic medium comprising a plurality of alcohols of different molecular weight selected from the group consisting of methanol, ethanol, propanol, iso-propanol, n-butanol, sec-butanol, tert-butanol, n-pentanol, iso-pentanol, n-hexanol, iso-hexanol, 2-ethylbutanol, cyclohexanol, heptanol-3, n-octanol, octanol-2, 2-ethylhexanol, nonanol and dodecanol and also a substance selected from the group consisting of sebacic acid and phthalic acid esters of said alcohol and benzene to absorption by a polystyrene cationic ion exchange resin acidified with a group selected from the class consisting of sulfonic, phosphonic, carboxylic and phenolic groups and cross-linked by an agent selected from the class consisting of divinyl acetylene, divinyl benzene and methylallyl chloride the absorptive capacity of which is greater for the alcohol of lower molecular weight than for the other components of said organic medium, thereby selectively absorbing said alcohol by said resin; subjecting the remaining organic medium to absorption by a polystyrene cationic ion exchange resin acidified with a group selected from the class consisting of sulfonic, phosphonic, carboxylic and phenolic groups and cross-linked by an agent selected from the class consisting of divinyl acetylene, divinyl benzene and methylallyl chloride the absorptive capacity of which is greater for the alcohol of next higher molecular weight; continuing such procedure until all of said alcohols have been absorbed from said organic medium; and desorbing said alcohols from said resins, thereby obtaining said alcohols.

6. A method of separating alcohols from organic mediums, comprising the steps of subjecting an organic medium comprising a plurality of alcohols of different molecular weight selected from the group consisting of methanol, ethanol, propanol, iso-propanol, n-butanol, sec-butanol, tert-butanol, n-pentanol, iso-pentanol, n-hexanol, iso-hexanol, 2-ethylbutanol, cyclohexanol, heptanol-3, n-octanol, octanol-2, 2-ethylhexanol, nonanol and dodecanol and also a substance selected from the group consisting of sebacic acid and phthalic acid esters of said alcohol and benzene to absorption by a polystyrene cationic ion exchange resin acidified with a group selected from the class consisting of sulfonic, phosphonic, carboxylic and phenolic groups and cross-linked by an agent selected from the class consisting of divinyl acetylene, divinyl benzene and methylallyl chloride the absorptive capacity of which is greater for the alcohol of lower molecular weight than for the other components of said organic medium, thereby selectively absorbing said alcohol by said resin; subjecting the remaining organic medium to absorption by a polystyrene cationic ion exchange resin acidified with a group selected from the class consisting of sulfonic, phosphonic, carboxylic and phenolic groups and cross-linked by an agent selected from the class consisting of divinyl acetylene, divinyl benzene and methylallyl chloride the absorptive capacity of which is greater for the alcohol of next higher molecular weight; continuing such procedure until all of said alcohols have been absorbed from said organic medium; and desorbing said alcohols from said resins by contacting the same with an alcohol of lower molecular weight, thereby obtaining said alcohols.

References Cited in the file of this patent

UNITED STATES PATENTS

| | | |
|---|---|---|
| 2,619,497 | Hockberger | Nov. 25, 1952 |
| 2,628,986 | Wallace et al. | Feb. 17, 1953 |
| 2,913,501 | Cahill | Nov. 17, 1959 |

OTHER REFERENCES

Lederer et al.: Chromatography (2nd ed.), pp. 94–97 (1957).